United States Patent [19]

Tanooka et al.

[11] Patent Number: 4,691,796

[45] Date of Patent: Sep. 8, 1987

[54] CONTROL APPARATUS FOR POWER-ASSISTED STEERING SYSTEM

[75] Inventors: Shigeo Tanooka; Yutaka Mori; Akihiro Oono, all of Kariya; Akira Hasegawa, Toyota, all of Japan

[73] Assignee: Toyota Jidosha Kabushiki Kaisha, Aichi, Japan

[21] Appl. No.: 773,233

[22] Filed: Sep. 6, 1985

[30] Foreign Application Priority Data

Sep. 10, 1984 [JP] Japan .................................. 59-190423

[51] Int. Cl.$^4$ ............................................... B62D 5/08
[52] U.S. Cl. ..................................................... 180/142
[58] Field of Search ............... 180/141, 142, 143, 132, 180/79.1

[56] References Cited

U.S. PATENT DOCUMENTS

| 4,453,615 | 6/1984 | Kanazawa et al. | 180/142 |
| 4,476,529 | 10/1984 | Nakamura et al. | 180/142 X |
| 4,513,835 | 4/1985 | Fukino et al. | 180/142 |

FOREIGN PATENT DOCUMENTS

| 54-53427 | 4/1979 | Japan | 180/142 |
| 55-79754 | 6/1980 | Japan | 180/142 |
| 58-209655 | 12/1983 | Japan | 180/142 |

Primary Examiner—John J. Love
Assistant Examiner—Charles R. Watts
Attorney, Agent, or Firm—Parkhurst & Oliff

[57] ABSTRACT

A control apparatus for a power-assisted steering system includes a first sensor arranged to produce output signals respectively indicative of rotary angle and rotational speed of a steering shaft, a second sensor arranged to produce an output signal indicative of the vehicle speed, a first control valve arranged to control the quantity of fluid under pressure supplied through a servo valve into a hydraulic power cylinder from a hydraulic pressure source, a second control valve disposed within a bypass passage for providing bypass flow of fluid passing therethrough from the pressure source to a reservoir, and an electric control apparatus arranged to activate the first control valve in response to the output signals from the sensors in such a manner that the quantity of fluid under pressure supplied into the power cylinder is decreased in accordance with increase of the vehicle speed and increased in accordance with increase of the rotational speed of the steering shaft and being further arranged to activate the second control valve in response to the output signals from the second sensor in such a manner that the opening degree of the second control valve is increased in accordance with increase of the rotary angle of the steering shaft and decreased in accordance with increase of the rotational speed of the steering shaft.

3 Claims, 8 Drawing Figures (A₁)

(B₁)

(A₂)

(B₂)

(A₃)

(B₃)

CONTROL APPARATUS FOR POWER-ASSISTED STEERING SYSTEM

BACKGROUND OF THE INVENTION

The present invention relates to a power-assisted steering system for use in wheeled vehicles, and more particularly to a control apparatus for the power-assisted steering system which is arranged to control a hydraulic power assist to the driver's steering effort in accordance with a travel speed of the vehicle and/or a rotary angle and a rotational speed of the steering shaft.

Conventional power-assisted steering system are arranged to increase the hydraulic power assist in accordance with an increase of the rotary angle of the steering shaft so as to ensure stability of the steering wheel in its neutral position during high speed travel of the vehicle. It has, however, been experienced that when the steering wheel is fully rotated during low speed travel of the vehicle on a road, the driver's operational feel deteriorates because of an increase in the hydraulic power assist. If the hydraulic power assist is decreased in accordance with an increase of the rotary angle of the steering wheel during low speed travel of the vehicle, the driver's feel during rapid turning would deteriorate because of insufficient hydraulic power assist. Additionally, in operation of the conventional power-assisted steering system, as shown by the reference character L in FIG. 7, the manual torque necessary to effect the hydraulic power assist during high speed travel of the vehicle is substantially the same as that during low speed travel of the vehicle. For this reason, the steering wheel may not be sufficiently weighted during high speed travel of the vehicle.

SUMMARY OF THE INVENTION

It is, therefore, a primary object of the present invention to provide an improved control apparatus for the power-assisted steering system which is capable of decreasing the hydraulic power assist in accordance with an increase of the rotary angle of the steering wheel during low speed travel of the vehicle, of increasing the hydraulic power assist in accordance with an increase of the rotational speed of the steering wheel, and of decreasing the hydraulic power assist in accordance with an increase of the vehicle speed.

According to the present invention, the primary object is accomplished by providing a control apparatus for a power-assisted steering system which comprises a steering shaft arranged to be rotated by the driver's steering effort applied thereto, a source of hydraulic pressure, a hydraulic power cylinder having a power piston mounted therein for reciprocating movement and operatively connected to driven members of the steering system, and a servo valve associated with the power cylinder to interconnect the hydraulic pressure source and the power cylinder and being responsive to rotary motion of the steering shaft for selectively directing the flow of fluid under pressure from the hydraulic pressure source to one of opposite fluid chambers of the power cylinder and permitting the flow of fluid from the other fluid chamber to a fluid reservoir to effect reciprocating movement of the power piston. The control apparatus comprises a first sensor for detecting rotary motion of the steering shaft and for producing output signals indicative of a rotary angle and a rotational speed of the steering shaft, a second sensor for detecting the vehicle speed and for producing an output signal indicative of the vehicle speed, electrically operated valve means arranged for controlling the quantity of fluid under pressure supplied through the servo valve into the power cylinder from the hydraulic pressure source, and means responsive to the output signals from the first and second sensors for energizing the value means in such a manner that the quantity of fluid under pressure supplied into the power cylinder is decreased in accordance with an increase of the vehicle speed and/or an increase of the rotary angle of the steering shaft and is increased in accordance with an increase of the rotational speed of the steering shaft.

In the actual practice of the present invention, it is preferable that the electrically operated valve means include a first electrically operated control valve arranged to control the quantity of fluid under pressure supplied through the servo valve into the power cylinder from the hydraulic pressure source, and a second electrically operated control valve, of the normally closed type, disposed within a bypass passage for providing bypass flow of fluid passing therethrough from the hydraulic pressure source to the reservoir in its energized condition. In this case, the means responsive to the output signals from the first and second sensors is in the form of an electric control apparatus arranged to energize the first control valve in response to the output signals from the first and second sensors in such a manner that the quantity of fluid under pressure supplied into the power cylinder is decreased in accordance with increase of the vehicle speed and increased in accordance with an increase of the rotational speed of the steering shaft and being further arranged to energize the second control valve in response to the output signals from the second sensor in such a manner that the opening degree of the second control valve is increased in accordance with an increase of the rotary angle of the steering shaft and decreased in accordance with an increase of the rotational speed of the steering shaft.

BRIEF DESCRIPTION OF THE DRAWINGS

Additional objects and advantages of the present invention will become more readily apparent from the following detailed description of a preferred embodiment thereof when taken together with the accompanying drawings, in which.

DETAILED DESCRIPTION OF THE PREFERRED EMBODIMENT

Figure 1:
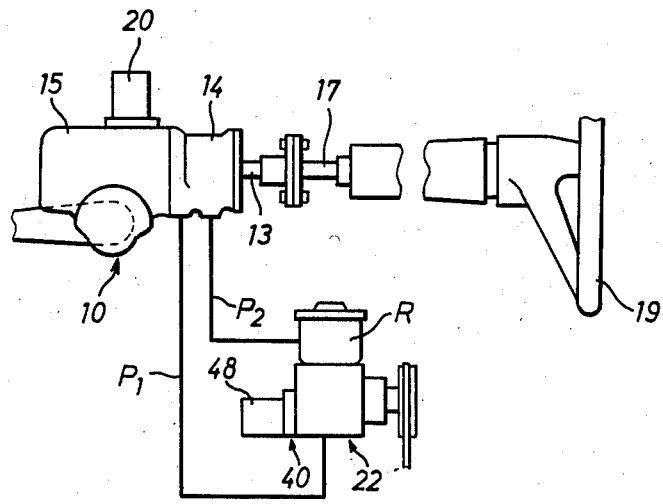
FIG. 1 is a schematic illustration of a power-assisted steering system in a wheeled vehicle.
Figure 7:
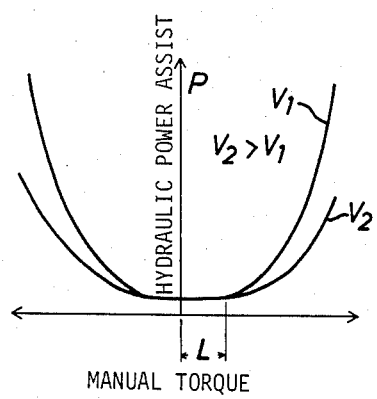
FIG. 7 is a graph illustrating a relationship between manual torque and hydraulic power assist in operation of a conventional power-assisted steering system.

Referring now the the drawings, FIG. 1 illustrates a power-assisted steering system 10 in a wheeled vehicle which comprises a servo valve 14, a hydraulic power cylinder 15, and a source of hydraulic pressure in the form of a fluid pump 22 driven by a prime mover of the vehicle. The servo valve 14 is associated with the hydraulic power cylinder 15 in a common cylinder housing and is operatively connected to a steering shaft 17 which is arranged to be rotated by the driver's steering effort applied to a steering wheel 19. The servo valve 14 has an inlet port connected to the fluid pump 22 by way of a pressure conduit $P_1$, and an exhaust port connected to a fluid reservoir R of the pump 22 by way of an exhaust conduit $P_2$. The hydraulic power cylinder 15 includes therein a power piston mounted for reciprocating movement and operatively connected to steerable road-engaging wheels of the vehicle by way of a steering linkage (not shown). In such an arrangement, the servo valve 14 interconnects the hydraulic power cylinder 15 and the fluid pump 22 and is responsive to rotary motion of the steering shaft 17 to selectively direct the flow of fluid under pressure from the pump 22 to opposite fluid chambers of the power cylinder 15 thereby to effect reciprocating movement of the power piston.

Figure 2:
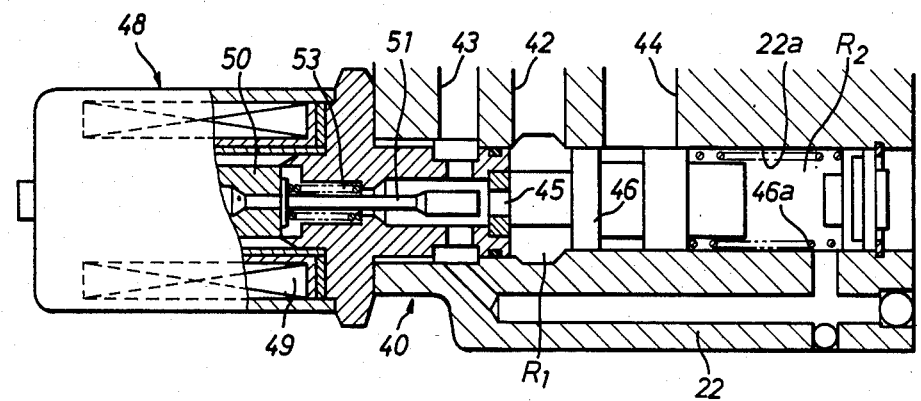
FIG. 2 is a sectional view of an electrically operated flow control valve assembly mounted within the fluid pump shown in FIG. 1.

In the power-assisted steering system 10, the fluid pump 22 is provided with an electrically operated flow control valve assembly 40 which is arranged to control the quantity of fluid supplied into the servo valve 14 from the pump 22 in such a manner as described later. As is illustrated in FIG. 2, the flow control valve assembly 40 comprises a throttle 45 arranged to control the flow of fluid under pressure flowing therethrough into an outlet port 43 from a delivery port 42 of the pump 22, a valve spool 46 arranged to open and close a bypass port 44 in accordance with axial movement thereof, and a first electromagnetic control valve 48 arranged to control the opening degree of throttle 45. The outlet port 43 is connected to the inlet port of servo valve 14 through the pressure conduit $P_1$, while the bypass port 44 is connected to the fluid reservoir R of pump 22. The valve spool 46 is slidably disposed within an axial bore 22a in the pump housing to subdivide the interior of the axial bore 22a into a first chamber $R_1$ in open communication with the delivery port 42 and a second chamber $R_2$ in open communication with downstream of he throttle 45. The valve spool 46 is biased toward the first chamber $R_1$ by means of a compression coil spring 46a in the second chamber $R_2$. Thus, the axial movement of valve spool 46 is effected by the difference in pressure between the first and second chambers $R_1$ and $R_2$ to control the quantity of fluid under pressure supplied into the servo valve 14.

Figure 4:
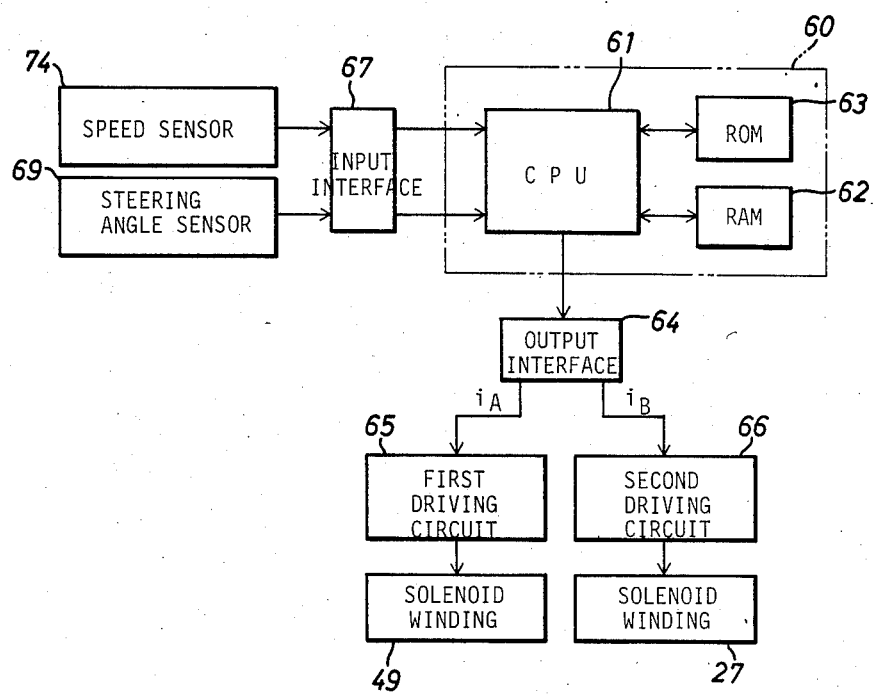
FIG. 4 is a schematic block diagram of an electric control apparatus for the power-assisted steering system in accordance with the present invention.

The first electromagnetic control valve 48 includes a solenoid winding 49 connected to an electric control apparatus shown in FIG. 4, a movable spool 50 axially slidably disposed within the solenoid winding 49 to be displaced in response to energization of the solenoid winding 49, a compression coil spring 53 arranged to bias the movable spool 50 leftward, and a valve shaft 51 integrally connected to the movable spool 50 to control the opening degree of throttle 45. During deenergization of the solenoid winding 49, the movable spool 50 is maintained in an original position under the load of spring 53 so that the valve shaft 51 is positioned to fully open the throttle 45. When applied with a control current from the electric control apparatus as described in detail later, the solenoid winding 49 is energized to attract the movable spool 50 in accordance with a valve of the control current against the load of spring 53 such that the valve shaft 51 is displaced to decrease the opening degree of throttle 45 so as to decrease the quantity of fluid under pressure supplied into the servo valve 14 through the outlet port 43.

Figure 3:
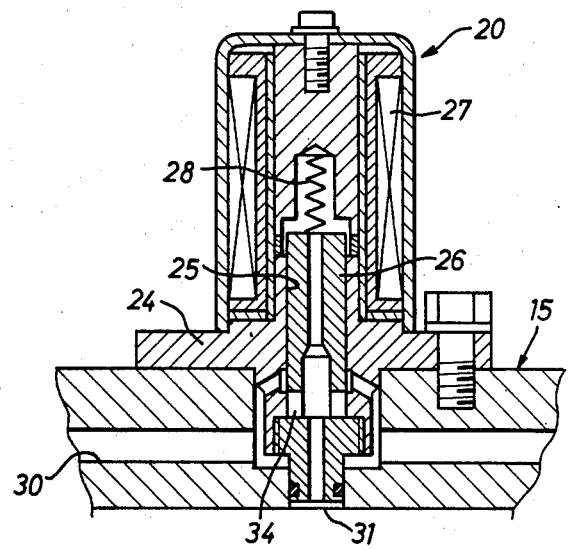
FIG. 3 is a sectional view of an electromagnetic control valve mounted on the cylinder housing shown in FIG. 1.

As shown in FIGS. 1 and 3, a second electromagnetic control valve 20 is mounted on the cylinder housing and disposed within a bypass 30, 31 between the opposite fluid chambers of hydraulic power cylinder 15. The control valve 20 is of the normally closed type and comprises a main body 24 secured in a fluid-tight manner to the cylinder housing, a hollow spool 26 axially movable in a bore 25 in main body 24, and a solenoid winding 27 in surrounding relationship with the spool 26. The spool 26 is loaded by a compression coil spring 28 downwards and normally positioned at its downward stroke end to interrupt fluid communication between sections 30 and 31 of the bypass passage respectively in open communication with the opposite fluid chambers of power cylinder 15. When applied with a control current from the electric control apparatus as described in detail later, the solenoid winding 27 is energized to attract the spool 26 upwards in accordance with a valve of the control current such that the fluid communication between sections 30 and 31 of the bypass passage is established across radial slots 34 of spool 26 to permit bypass flow of fluid between the opposite fluid chambers of power cylinder 15.

In FIG. 4, there is illustrated the electric control apparatus which comprises a microcomputer 60 including a central processing unit or CPU 61, a random access memory of RAM 62, and a read-only memory or ROM 63. The CPU 61 is connected to a steering angle sensor 69 and a speed sensor 74 through an input interface 67 and is connected through an output interface 64 to first and second driving circuits 65 and 66 which are respectively connected to the solenoid windings 49 and 27 of first and second control valves 48 and 20. The steering angle sensor 69 is in the form of a rotary encoder mounted on the steering shaft 17 to produce output signals respectively indicative of a rotary angle $\theta$ and a rotational speed $\dot\theta$ of the steering shaft 17. The speed sensor 74 is mounted on an output shaft of a power transmission of the vehicle to produce an output signal indicative of the vehicle speed V.

Figure 5:
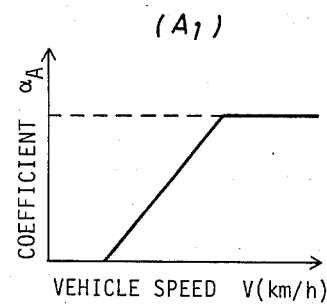
FIG. 5 illustrates graphs representing control patterns for the electromagnetic control valve shown in FIG. 2 and for the electromagnetic control valve shown in FIG. 3.
Figure 5:
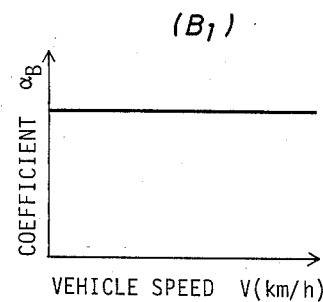
Figure 5:
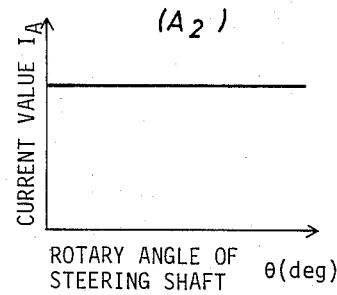
Figure 5:
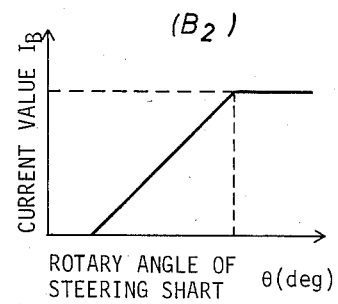
Figure 5:
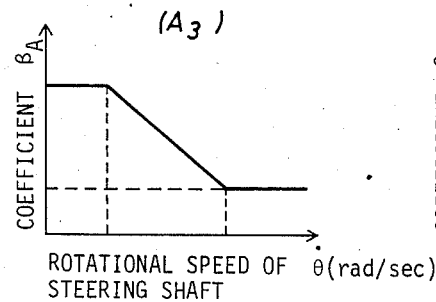
Figure 5:
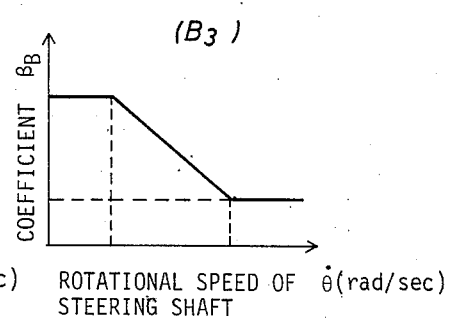

The ROM 63 is arranged to memorize the following control patterns for determining control currents $i_A$ and $i_B$ respectively applied to the solenoid windings 49 and 27 of first and second control valves 48 and 20. As is illustrated in FIG. 5, graphs A1, A2 and A3 each represent a control pattern for the first control valve 48, and graphs B1, B2 and B3 each represent a control pattern for the second control valve 20. The graphs A1 and B1 represent coefficients $\alpha_A$ and $\alpha_B$ respectively in relation to the vehicle speed V, the graphs A2 and B2 represent current values $I_A$ and $I_B$ respectively in relation to the rotary angle $\theta$ of steering shaft 17, and the graphs A3 and B3 represent coefficients $\beta_A$ and $\beta_B$ respectively in relations to the rotational speed $\dot\theta$ of steering shaft 17. The coefficient $\alpha_A$ in graph A1 is determined to an increase in accordance with increase of the vehicle speed V, and the coefficient $\alpha_B$ in graph B1 is determined in a constant value. The current value $I_A$ in graph A2 is determined in a constant value, and the current value $I_B$ in graph B2 is determined to increase in accordance with an increase of the rotary angle $\theta$ of steering shaft 17. The coefficient $\beta_A$ in graph A3 is determined to decrease in accordance with an increase of the rotational speed $\dot\theta$ of steering shaft 17, and the coefficient $\beta_B$ in graph B3 is also determined to decrease in accordance with an increase in the rotational speed $\dot\theta$ of steering shaft 17.

Figure 6:
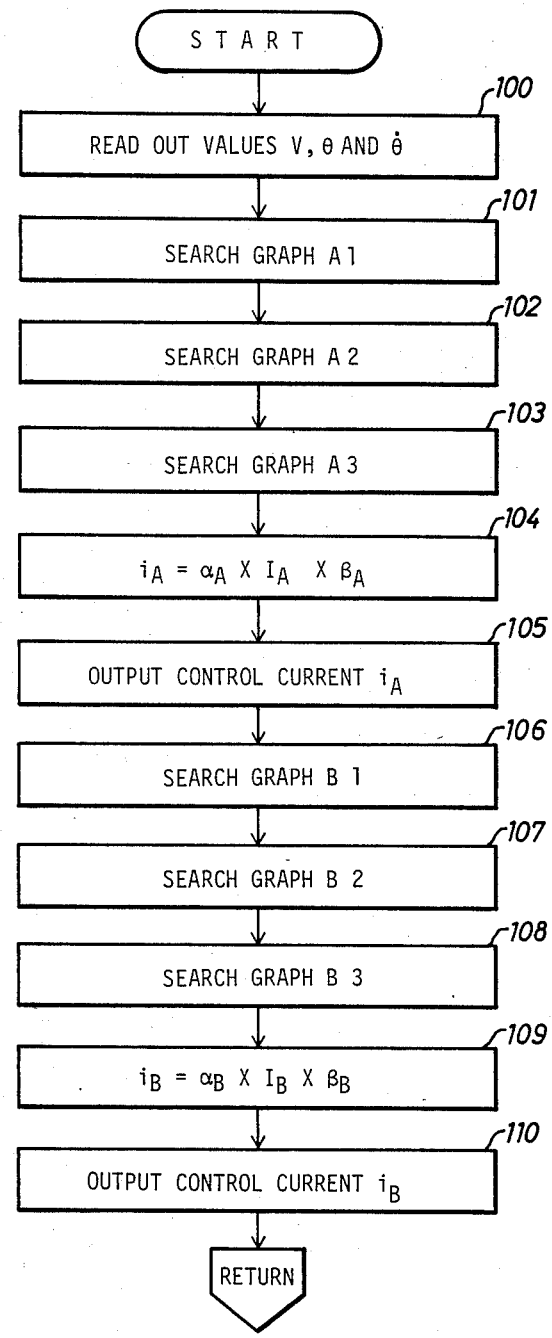
FIG. 6 is a flow chart for control of the electromagnetic control valves.

Hereinafter, the operation of the power-assisted steering system will be described. Assuming that the servo valve 14 is in its neutral position while the fluid pump 22 is driven by the prime mover, the servo valve 14 is supplied with fluid under pressure from the pump 22 and permits the flow of fluid passing therethrough to the fluid reservoir R of pump 22. When the steering shaft 17 is rotated by the driver's steering effort applied to the steering wheel 19, the servo valve 14 is actuated in response to rotary motion of the steering shaft 17 to establish fluid communication between the pressure conduit $P_1$ and one of the opposite fluid chambers of power cylinder 15 and to establish fluid communication between the exhaust conduit $P_2$ and the other fluid chamber of power cylinder 15. Thus, the resulting pressure differential across the power piston provides a hydraulic power assist to the driver's steering effort applied to the steering wheel 19 during turning maneuver of the vehicle. In such operation of the steering wheel 19, the steering angle sensor 69 detects rotary motion of the steering shaft 17 to produce output signals respectively indicative of the rotary angle $\theta$ and rotational speed $\dot\theta$ of steering shaft 17. Simultaneously, the speed sensor 74 detects the vehicle speed to produce an output signal indicative of the vehicle speed V. The output signals from sensors 69 and 74 are applied to the CPU 61 through input interface 67 and temporarily memorized in the RAM 62, while the CPU is initialized in response to an interruption signal to execute a control program of FIG. 6.

When the program proceeds to a step 100, the vehicle speed V, the rotary angle $\theta$ and rotational speed $\dot\theta$ of the steering shaft 17 are read out from the RAM 62 and memorized in an internal register of the CPU 61. At the following steps 101, 102 and 103, the CPU 61 successively searches the control patterns of A1, A2 and A3 in FIG. 5 to determine a coefficient $\alpha_A$ in relation to the vehicle speed V, a constant current value $I_A$, and a coefficient $\beta_A$ in relation to the rotational speed $\dot\theta$ of steering shaft 17, and in turn, the searched coefficient $\alpha_A$, constant current value IA and coefficient $\beta_A$ are temporarily memorized in the RAM 62. When the program proceeds to a step 104, the CPU 61 calculates an equation $i_A = \alpha_A \times I_A \times \beta_A$ in dependence upon the memorized coefficients and current value to apply a control current indicative of the multiplied value $i_A$ at a step 105 of the program to the solenoid winding 49 of the first control valve 48 through the output interface 64 and first driving circuit 65. At the following steps 106, 107 and 108, the CPU 61 successively searches the control patterns of B1, B2 and B3 in FIG. 5 to determine a constant coefficient $\alpha_B$, a current value $I_B$ in relation to the rotary angle $\theta$ of steering shaft 17, and a coefficient $\beta_B$ in relation to the rotational speed $\dot\theta$ of steering shaft 17, and in turn, the searched coefficient $\alpha_B$, current value $I_B$ and coefficient $\beta_B$ are temporarily memorized in the RAM 62. When the program proceeds to a step 109, the CPU 61 calculates an equation $i_B = \alpha_B \times I_B \times \beta_B$ in dependence upon the memorized coefficients and current value to apply a control current indicative of the multiplied value $i_B$ at a step 110 of the program to the solenoid winding 27 of the second control valve 20 through the output interface 64 and second driving circuit 66.

In such an execution of the control program as described above, the multiplied value $i_A$ increases in accordance with an increase of the vehicle speed V, the multiplied value $i_B$ increases in accordance with an increase of the rotary angle $\theta$ of steering shaft 17, and both the multiplied values $i_A$ and $I_B$ decrease in accordance with an increase of the rotational speed $\dot\theta$ of steering shaft 17. It is, therefore, noted that when the solenoid winding 49 of the first control valve 48 is energized by the control current $i_A$, the valve shaft 51 is displaced against the load of spring 53 to decrease the opening degree of throttle 45 in flow control valve assembly 40 in accordance with increase of the vehicle speed. As a result, the quantity of fluid under pressure supplied into the servo valve 14 is decreased to enhance stability in operation of the steering wheel 19 during high speed travel of the vehicle. When the solenoid winding 27 of the second control valve 20 is energized by the control current $i_B$, the spool 26 is displaced against the load of spring 28 to increase the quantity of fluid flowing through the bypass passage 30, 31 in accordance with an increase of the rotary angle $\theta$ of steering shaft 17. As a result, the hydraulic power assist to the driver's steering effort is decreased to ensure reliable turning maneuver of the vehicle.

Figure 8:
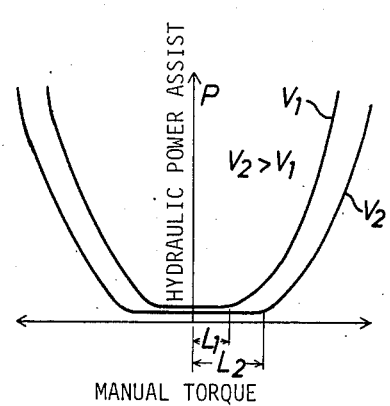
FIG. 8 is a graph illustrating a relationship between manual torque and hydraulic power assist in operation of the power-assisted steering system under control of the electrical control apparatus shown in FIG. 4.

When both the solenoid windings 49 and 27 of the first and second control valves 49 and 20 are energized by the control currents $i_A$ and $i_B$, the valve shaft 51 is conditioned to increase the opening degree of throttle 45 in accordance with an increase of the rotational speed of steering shaft 17, and the spool 26 is conditioned to decrease th quantity of fluid flowing through the bypass passage 30, 31 in accordance with an increase in the rotational speed of steering shaft 17. As a result, the hydraulic power assist to the driver's steering effort is increased to facilitate turning maneuver of the vehicle in rapid operation of the steering wheel 17. It is further noted that the multiplied value $i_A$ is determined in dependence upon the vehicle speed V and the rotational speed $\dot\theta$ of steering shaft 17, while the multiplied value $i_B$ is determined in dependence upon the rotary angle $\theta$ and rotational speed $\dot\theta$ of steering shaft 17. This means that as shown by the reference characters $L_1$ and $L_2$ in FIG. 8, a manual torque $T_M$ for effecting the hydraulic power assist during high speed travel of the vehicle becomes larger than that during low speed travel of the vehicle. As a result, the hydraulic power assist is decreased during high speed travel of the vehicle.

Having now fully set forth both structure and operation of the preferred embodiment of the concept underlying the present invention, various other embodiments as well as certain variations and modifications of the embodiment herein shown and described will obviously occur to those skilled in the art upon becoming familiar with said underlying concept. For example, the electromagnetic control valve 20 may be disposed within a bypass passage between the pressure conduit $P_1$ and the exhaust conduit $P_2$. It is to be understood, therefore, that within the scope of the appended claims, the invention may be practiced otherwise than as specifically set forth herein.

What is claimed is:

1. A control apparatus for a power-assisted steering system in a vehicle including a rotatable steering shaft, a source of hydraulic pressure, a hydraulic power cylinder having a reciprocating power piston mounted therein and opposite fluid chambers, driven members operatively connected to said power piston, and a servo valve associated with said power cylinder to interconnect said hydraulic pressure source and said power cylinder, said servo valve being responsive to rotary motion of said steering shaft for selectively directing the flow of fluid under pressure from said hydraulic pressure source to one of said opposite fluid chambers of said power cylinder and permitting fluid from the other of said opposite fluid chambers to flow into a fluid reservoir thus effecting reciprocating movement of said power piston, said control apparatus comprising:

a first sensor for detecting rotary motion of said steering shaft and for producing a first output signal indicative of a rotary angle of said steering shaft and a second output signal indicative of a rotational speed of said steering shaft;

a second sensor for detecting a speed of the vehicle and for producing a third output signal indicative of the vehicle speed;

a first electrically operated control valve arranged to control a quantity of fluid under pressure discharged from said hydraulic pressure source;

a second electrically operated control valve of the normally closed type disposed within a bypass passage between the opposite fluid chambers of said power cylinder, whereby when said second control valve is in an energized condition fluid can flow therethrough thereby providing bypass flow; and an electric control apparatus arranged to energize said first control valve in response only to said second and third output signals from said first and second sensors whereby the quantity of said fluid under pressure supplied into said power cylinder from said hydraulic pressure source is decreased in accordance with an increase of the vehicle speed and increased in accordance with an increase of the rotational speed of said steering shaft and being arranged to energize said second control valve in response to the first and second output signals from said first sensor whereby the degree of opening of said second control valve is increased in accordance with an increase of the rotary angle of said steering shaft thereby decreasing power assist, and decreased in accordance with an increase of the rotational speed of said steering shaft thereby increasing power assist.

2. The control apparatus according to claim 1, wherein said hydraulic pressure source is a fluid pump driven by a prime mover of the vehicle, said fluid pump being provided with a flow control valve for controlling fluid under pressure discharged from said pump in a predetermined quantity, and wherein said first control valve and said flow control valve cooperate to control the quantity of fluid under pressure supplied through said flow control valve into said power cylinder under control of said electric control apparatus.

3. The control apparatus according to claim 2, wherein said second control valve is an electromagnetic control valve of the normally closed type and is mounted on the housing of said hydraulic power cylinder and disposed within a bypass passage, and wherein said bypass passage is formed through a peripheral wall of said power cylinder between the opposite fluid chambers of said power cylinder.

* * * * *